Figure 1:
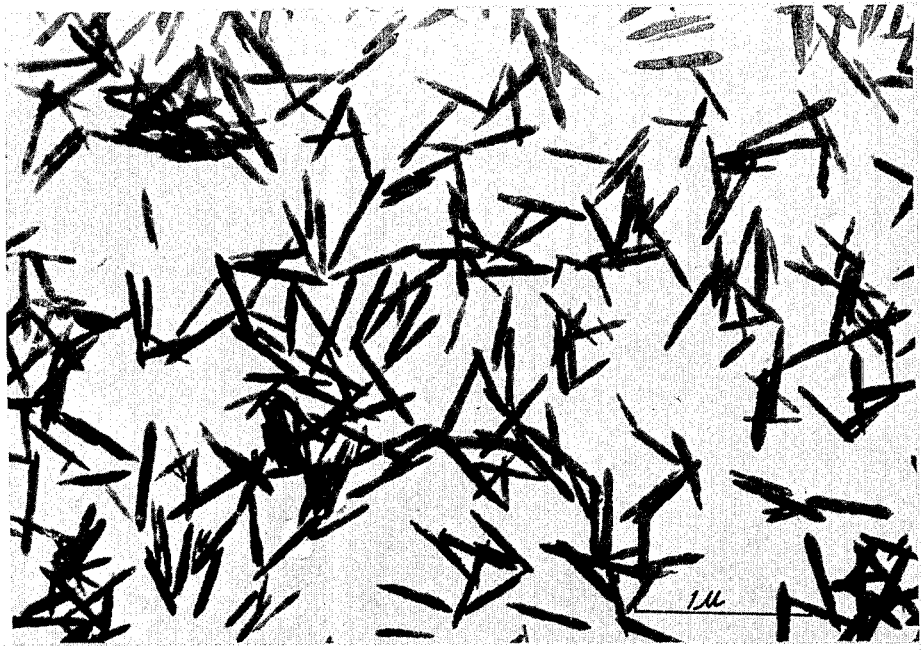

United States Patent [19]

Matsumoto et al.

[11] 4,202,871

[45] May 13, 1980

[54] PRODUCTION OF ACICULAR FERRIC OXIDE

[75] Inventors: Seiji Matsumoto, Sakai; Tadashi Koga, Osaka; Kiyoshi Fukai, Sakai; Shinya Nakatani, Kishiwada, all of Japan

[73] Assignee: Sakai Chemical Industry Co., Ltd., Sakai, Japan

[21] Appl. No.: 957,861

[22] Filed: Nov. 6, 1978

[30] Foreign Application Priority Data

Nov. 14, 1977 [JP] Japan .................................. 52/137087
Nov. 18, 1977 [JP] Japan .................................. 52/139271

[51] Int. Cl.² .................. C01G 49/06; C01G 49/08; B01J 17/04
[52] U.S. Cl. ............................ 423/632; 23/300; 23/305 F; 423/266; 423/633; 423/634; 252/62.56

[58] Field of Search ................ 423/632, 633, 634, 266; 106/304; 252/62.56; 23/300, 305 F

[56] References Cited

U.S. PATENT DOCUMENTS 4,071,610  1/1978  Koester et al. ...................... 423/634

FOREIGN PATENT DOCUMENTS 2461937  7/1976  Fed. Rep. of Germany ........... 423/633
2508932  9/1976  Fed. Rep. of Germany ........... 106/304
51-24478  7/1976  Japan ...................................... 423/634

Primary Examiner—Jack Cooper
Attorney, Agent, or Firm—Haight & Huard

[57] ABSTRACT

Single crystalline, acicular ferric oxide particles are produced by maintaining an aqueous suspension of ferric hydroxide at an elevated temperature at an alkaline pH in the presence of an organic phosphonic acid compound or a hydroxycarboxylic acid compound as a growth-regulating agent.

12 Claims, 4 Drawing Figures

PRODUCTION OF ACICULAR FERRIC OXIDE

This invention relates to the production of single crystalline, acicular ferric oxide particles which are particularly useful for the production of magnetic recording materials such as $\gamma\text{-Fe}_2\text{O}_3$ or magnetite.

Recent developments in magnetic recording media such as audio tapes, video tapes, other magnetic recording tapes or discs require improvement in crystallographic properties of the magnetic powder used therein.

Heretofore acicular iron oxides such as $\gamma\text{-Fe}_2\text{O}_3$ or magnetite, which have been commonly used for such purposes, are prepared by calcinating acicular goethite followed by reducing and reoxidizing.

Since a dehydration reaction takes place during the calcination step of goethite and because of its tactoidal structure the resulting particles include a number of pin-holes through which the formed $\text{H}_2\text{O}$ evaporates and also tend to aggregate into a mass of various forms. Accordingly the resulting magnetic powder contains a number of irregular crystalline particles which are porous, fused together at an angle, and have protuberances or branches. This makes the required uniform orientation of the magnetic particles on the recording media to be difficult and causes deterioration of the performance of the resulting recording media.

The single crystalline, acicular ferric oxide particles which may be produced by the method of the present invention have well-defined, relatively uniform, single crystalline, acicular crystallographic configuration. Since they are composed of $\alpha\text{-Fe}_2\text{O}_3$, no dehydration reaction takes place and the acicular configuration may be retained to a maximum extent during the subsequent steps for producing a magnetic material such as $\gamma\text{-Fe}_2\text{O}_3$ or magnetite without aggregation, and formation of pin-holes and protuberances. The resulting magnetic material may be, therefore, easily oriented when applied on a magnetic recording medium such as tapes or discs and greatly improves the performance thereof. The ferric oxide particles prepared by the method of the present invention may find other valuable uses based on their crystallographic property such as for the production of orientatable ferrite particles.

According to the present invention, there is provided a method for producing acicular ferric oxide particles which comprises maintaining an aqueous suspension of ferric hydroxide at an elevated temperature at an alkaline pH in the presence of a growth-regulating agent selected from the group consisting of an organic phosphonic acid, a salt thereof, an ester thereof, a hydroxycarboxylic acid, a salt thereof and an ester thereof.

The starting ferric hydroxide may be prepared by any conventional method such as by adding an alkali e.g. NaOH, KOH, or $\text{NH}_3$ to an aqueous solution of a water soluble ferric salt, or by oxidizing ferrous hydroxide in water. For example, the ferric hydroxide is prepared by adding an alkali to an aqueous solution of a soluble ferric salt until the alkalinity of the mixture reaches at a pH where almost all iron content therein precipitates quantitatively as amorphous ferric hydroxide. After filtering and washing, the precipitates are suspended in water. The concentration of which should not be high enough so that stirring of the suspension becomes difficult and is preferably between 1.5 moles/liter and 0.02 moles/liter in terms of the Fe content. A growth-regulating agent, which will be discussed in detail hereinafter, is added to the suspension. The concentration of the growth-regulating agent in the suspension is preferably between $10^{-5}$ and $10^{-1}$, more preferably between $10^{-4}$ and $10^{-2}$ moles in terms of the acid per mole of the Fe content. Then the suspension is adjusted at an alkaline pH, preferably at a pH between 8.0 and 12.5 with the addition of an alkali hydroxide.

Alternatively, the starting ferric hydroxide suspension may be prepared by heating an aqueous suspension of ferric hydroxide having a pH above 3.5, preferably 4.0 to 12.5 at a temperature higher than 30° C. to stabilize the suspension, adding said growth-regulating agent to a concentration as above, and adjusting the mixture to an alkaline pH as above if necessary. The growth-regulating agent may be incorporated when ferric hydroxide is precipitated. Namely the growth-regulating agent may be added to the solution of an aqueous ferric salt at the above-described concentration prior to the addition of an alkali thereto. In this case the growth-regulating agent occurs as a complex with ferric hydroxide and any further addition thereof is not required after suspending the resulting ferric hydroxide in water.

The starting ferric hydroxide suspension thus prepared is then subjected to a heat treatment at an elevated temperature with stirring for a period of time sufficient to convert the amorphous ferric hydroxide into the desired acicular ferric oxide particles.

The reaction temperature may be between 80° C. and 300° C., preferably between 100° C. and 250° C. In order to obtain a sufficient reaction velocity, it is preferable to carry out the reaction at a temperature above 100° C. using a closed reaction vessel such as autoclaves. The higher limit of the reaction temperature depends on the decomposition point of the particular growth-regulating agent. After the reaction, the resulting acicular paticles of $\alpha\text{-Fe}_2\text{O}_3$ are filter off, washed with water and then dried.

The resulting product may be converted into magnetite by heating it in a reducing atmosphere, or into $\gamma\text{-Fe}_2\text{O}_3$ by oxidizing the resulting magnetite according to procedures well known in the art while retaining their original acicular configuration.

The growth-regulating agent used in the present invention functions to regulate the direction and the speed of growth of $\alpha\text{-Fe}_2\text{O}_3$ crystals. In a reaction system where such growth-regulating agent is not present, the $\alpha\text{-Fe}_2\text{O}_3$ crystals take a cubic, platelet or mica-like form. The growth regulating agent also functions to inhibit the formation and growth of goethite crystals from amorphous ferric hydroxide in the reaction system.

The growth-regulating agent which may be used in the method of the present invention include an organic phosphonic acid, a salt thereof, an ester thereof, a hydroxycarboxylic acid, an ester and a salt thereof. They are capable of forming a complex with iron atoms and must be stable under the reaction conditions, namely under heating at least 100° C. in an alkaline medium, and also soluble in water.

Examples of the organic phosphonic acids to be employed include those having at least one aminomethylenephosphonic group,

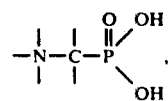

in the molecule, typically represented by the formula:

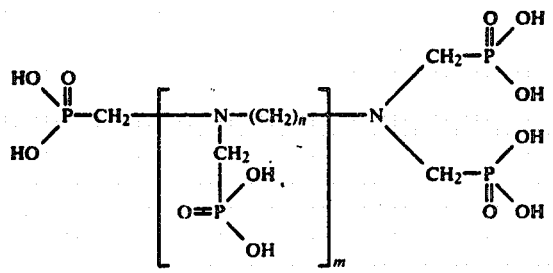

wherein n and m are repeating units and preferably n is 2 to 6, and m is 0 to 5. Specific examples of the class of compounds having the above formula include amino-tri (methylenephosphonic acid), ethylenediaminetetra (methylenephosphonic acid), hexamethylenediaminetetra (methylenephosphonic acid), diethylenetriaminepenta (methylenephosphonic acid), triethylenetetraminehexa (methylenephosphonic acid), tetraethylenepentaminehepta-(methylenephosphonic acid), and pentaethylenehexamineocta (methylenephosphonic acid).

Another type of the organic phosphonic acid which may be employed in the present invention has the following formula:

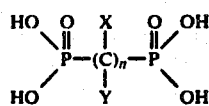

wherein X and Y are hydrogen, hydroxy, amino, or $C_1$–$C_6$ alkyl or aryl, and n is 1 to 6. Specific examples thereof include methylenediphosphonic acid, ethylene-1,1'-diphosphonic acid, ethylene-1,2-diphosphonic acid, propylene-1,1'-diphosphonic acid, propylene-1,3-diphosphonic acid, hexamethylene-1,6-diphosphonic acid, 2,4-dihydroxypentamethylene-2,4-diphosphonic acid, 2,5-dihydroxyhexamethylene-2,5-diphosphonic acid, 2,3-dihydroxybutylene-2,3-diphosphonic acid, 1-hydroxybenzyl-1,1'-diphosphonic acid and 1-aminoethylene-1,1'-diphosphonic acid. Particularly, hydroxyalkylene-1,1'-diphosphonic acids of the formula:

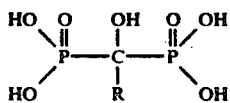

wherein R is hydrogen or $C_1$–$C_5$ alkyl, such as hydroxymethylenediphosphonic acid, 1-hydroxypropylene-1,1'-diphosphonic acid, 1-hydroxybutylene-1,1'-diphosphonic acid, or 1-hydroxyhexamethylene-1,1'-diphosphonic acid are preferable. The organic phosphonic acid may be used in the form of a free acid, a water soluble salt or a water soluble ester.

Examples of the hydroxycarboxylic acids which may be employed in the present invention are preferably α-hydroxyaliphaticcarboxylic acids and include malic acid, α-methylmalic acid, propyltartronic acid, α-hydroxyglutaric acid, citric acid, agaricic acid, norcaperatic acid, desoxalic acid, tartaric acid and dihydroxyglutaric acid. Water soluble salts or water soluble esters of said hydroxycarboxylic acids may be also employed.

Figure 2:
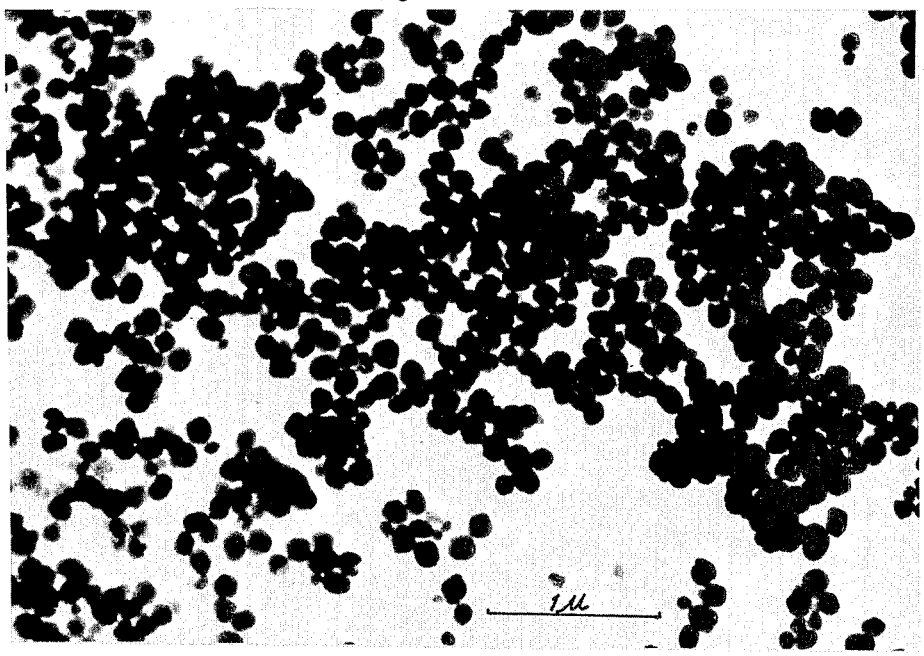

The crystallographic characteristics of the acicular ferric oxide particles produced by the method of the present invention may be seen in the accompanying drawings wherein FIG. 1 is an electron microscopic picture of the acicular ferric oxide particles produced by the method of the present invention and FIG. 2 is a similar picture of ferric oxide particles produced by a method which is similar to the present invention except that no growth-regulating agent is added. By comparing FIG. 1 and FIG. 2, it is apparent that the present invention is surprisingly effective to control the growth of ferric oxide crystals into single crystalline, acicular particles.

Figure 3:
Figure 4:

FIG. 3 is a picture of $\gamma$-$Fe_2O_3$ particles produced from the ferric oxide particles of FIG. 1 by a conventional method and FIG. 4 is a picture of the corresponding $\gamma$-$Fe_2O_3$ particles produced from acicular goethite particles in a conventional method. It will be apparent in FIG. 3 and FIG. 4 that the magnetic powder produced by the method of the present invention is superior to conventional magnetic powder made from goethite.

The present invention will now be explained in further detail by making reference to the following examples.

EXAMPLE 1

To 3 liters of an aqueous solution of ferric chloride (Fe content, 16.7 g/liter) was added a 10% aqueous solution of sodium hydroxide until the pH of the solution becomes 7.5 and the mixture was heated at 60° C. The resulting red-brown, amorphous precipitates were filtered off and wash with 2 liters of hot water. The precipitates were re-suspended in water to make the suspension to 1 liter. To the suspension were added 1.6 g of aminotri-(methylenephosphonic acid) and a 5% aqueous solution of sodium hydroxide to adjust the suspension at a pH of 11.2. The suspension was then heated in a closed vessel at a temperature of 150° C. for 90 minutes with stirring. The resulting red-orange precipitates were filtered off, washed with water and air-dried to obtain 71 g of the desired acicular ferric oxide particles. The product was identified as α-$Fe_2O_3$ by X-ray diffraction crystallography. Electron microscopic observation revealed that they have an average particle length of 0.6 microns and an average diameter of 0.08 microns.

EXAMPLE 2

To 3 liters of an aqueous solution of ferric sulfate (Fe content, 17.0 g/liter) was bubbled ammonia with stirring until the pH of the solution becomes 7.5 and the mixture was heated at 70° C. The resulting red-brown, amorphous precipitates were filtered off and washed with 2 liters of hot water. The precipitates were re-suspended in water to make the suspension to one liter. To the suspension were added 3.35 g of ethylenediaminetetra (methylenephosphonic acid) and a 5% aqueous solution of sodium hydroxide to adjust the suspension at a pH of 11.0. The suspension was then heated in a closed vessel at a temperature of 180° C. for 100 minutes with stirring. The resulting red-orange precipitates were filtered off, washed with water and air-dried to obtain 72 g of the desired acicular ferric oxide particles. The product was identified as α-$Fe_2O_3$ by X-ray diffraction crystallography. Electron microscopic observation revealed that they have an average particle length of 0.7 microns and an average diameter of 0.1 microns.

The resulting acicular particles were heated in a oven at a temperature of 450° C. for 60 minutes, or at a temperature of 700° C. for 60 minutes. After this treatment formation of pin-holes and aggregates were not found and retention of the original acicular configuration was seen on the electron microscopic observation thereof.

EXAMPLE 3

To an aqueous solution of ferrous sulfate adjusted at a pH of 0.9 with sulfuric acid was added an amount of aqueous solution of hydrogen peroxide sufficient to oxidize the ferrous ions to ferric ions and the mixture was heated to decompose excessive hydrogen peroxide. To 2 liters of this solution containing Fe at a concentration 13.0 g/liter were added 2.0 g of diethylenetriaminehepta (methylenephosphonic acid) and a 10% aqueous solution of sodium hydroxide until the pH of the solution becomes 7.0. The resulting red-brown precipitates were filtered off, washed with 2 liters of hot water and re-suspended in water to make the suspension to 1 liter. The suspension was adjusted at a pH of 11.7 with a 5% aqueous solution of sodium hydroxide and then heated in a closed vessel at 200° C. for 60 minutes with stirring. The resulting red-orange precipitates were filtered off, washed with water and air-dried to obtain 35 g of the desired acicular ferric oxide particles. Electron microscopic observation of the product revealed that the product has an average particle length of 0.8 microns and an average particle diameter of 0.2 microns.

EXAMPLE 4

To 3 liters of an aqueous solution of ferric nitrate (Fe content, 18.5 g/liter) was added a 10% aqueous solution of sodium hydroxide until the pH of the solution becomes 7.5 and the mixture was heated at 70° C. The resulting precipitates were filtered off, washed with 2 liters of hot water and re-suspended in water to make the suspension to 1 liter. To the suspension was added 1.03 g of 1-hydroxyethylene-1,1'-diphosphonic acid and a 5% aqueous solution of sodium hydroxide to adjust the suspension at a pH of 12.0. The suspension was heated in a closed vessel at 220° C. for 120 minutes with stirring. The resulting red-orange precipitates were filtered off, washed with water and air-dried to obtain 79 g. of the desired acicular ferric oxide particles. The product was identified as $\alpha$-$Fe_2O_3$ by X-ray diffraction pattern and showed to have a single crystalline, acicular configuration of an average length of 5 microns and an average diameter of 0.3 microns on electron microscopic observation.

EXAMPLE 5

To 3 liters of an aqueous solution of ferric chloride (Fe content, 15.2 g/liter) was bubbled ammonia gas at a rate of 1 liter/minutes until the pH of the solution becomes 7.5 and the mixture was heated at 70° C. The resulting precipitates were filtered off, washed with 2 liters of hot water and resuspended in water to make the suspension to 1 liter. To the suspension were added 1.5 g of sodium 1-hydroxypropyl-1,1'-diphosphonate and a 5% aqueous solution of sodium hydroxide to adjust the suspension at a pH of 10.8. The suspension was heated in a closed vessel at 200° C. for 120 minutes with stirring. The resulting red-orange precipitates were filtered off, washed with water and air-dried to obtain 64 g of the desired acicular ferric oxide particles. It was observed by electron microscopic observation that the product has an average particle length of 1 micron and an average diameter of 0.15 microns.

EXAMPLE 6

To 2 liters of an aqueous solution of ferric sulfate (Fe content, 21.2 g/liter) was added a 10% aqueous solution of sodium hydroxide until the pH of the solution becomes 8.0. The resulting red-brown precipitates of ferric hydroxide were filtered off, washed with hot water and resuspended in water to make the suspension to 1 liter. To the suspension were added a mixture of 0.96 g of aminotri (methylenephosphonic acid) and 0.32 g of 1-hydroxyethylene-1,1'-diphosphonic acid, and a 5% aqueous solution of sodium hydroxide to adjust the suspension at a pH of 10.8. The suspension was heated in a closed vessel at 170° C. for 60 minutes with stirring. The resulting red-orange precipitates were filtered off, washed with water and air-dried to obtain 60 g of the desired acicular ferric oxide. Average particle length and average diameter of the product were 0.5 microns and 0.6 microns, respectively.

EXAMPLE 7

To 2 liters of an aqueous solution of ferric chloride was added a 10% aqueous solution of sodium hydroxide until the pH of the solution becomes 7.0 and the mixture was heated at 60° C. The resulting precipitates were filtered off, washed with 2 liters of hot water and re-suspended in water to make the suspension to 1 liter. To the suspension were added 3.0 g of a ternary mixture of diethylenetriaminepenta (methylenephosphonic acid), triethylenetetraminehexa (methylenephosphonic acid) and tetraethylenepentaminehepta (methylenephosphonic acid), having an acid number of 1205 mg KOH/g., and a 5% aqueous solution of sodium hydroxide to adjust the suspension at a pH of 11.0. The suspension was heated in a closed vessel at 160° C. for 90 minutes with stirring. The resulting red-orange precipitates were filtered off, washed with water and air-dried to obtain 63 g of the desired acicular ferric oxide particles. The average particle length and average diameter of the product were 0.4 microns and 0.08 microns, respectively.

EXAMPLE 8

To 1.5 liters of an aqueous solution of ferric chloride (13.7 g in terms of Fe/liter) was bubbled ammonia gas at a rate of 0.5 liter/minute until the pH of the solution becomes 8.0. The resulting red-brown precipitates were filtered off, washed with water and resuspended in water to make the suspension to 1.68 liter. To the suspension was added 116 ml. of a 0.1 M aqueous solution of sodium citrate. 1.5 liters of the suspension was heated in an autoclave to 160° C. where 9.57 ml. of a 14% aqueous solution of sodium hydroxide was added thereto. The mixture was maintained for additional 1 hour at 160° C. with stirring. The pH of the mixture was 11.9. Then the resulting precipitates were filtered off, washed with water and air-dried to obtain the desired acicular ferric oxide particles. The product was identified as $\alpha$-$Fe_2O_3$ by X-ray diffraction and showed to have an average length of 0.4 microns and an average diameter of 0.07 microns on electron microscopic observation.

EXAMPLE 9

To 2 liters of an aqueous solution of ferric chloride corresponding to a Fe concentration of 11.4 g/liter was added a 5% aqueous solution of sodium hydroxide to a pH of 7.2. The resulting red-brown precipitates were filtered off, washed with water and resuspended in 1 liter of water containing 4.6 g of sodium dl-tartarate dihydrate. The suspension was adjusted at a pH of 9.3 with sodium hydroxide and then heated in an autoclave at 140° C. for 8 hours. The resulting precipitates were filtered off, washed with water and dried to obtain the desired acicular ferric oxide particles. The product was identified as $\alpha$-$Fe_2O_3$ by X-ray diffraction and showed an average particle length of 0.3 microns and an average diameter of 0.06 microns on electron microscopic observation.

EXAMPLE 10

To 2 liters of an aqueous solution of ferric sulfate corresponding to a Fe concentration of 12.5 g/liter was added a 5% aqueous solution of sodium hydroxide to a pH of 7.8. The resulting precipitates were filtered off, washed with water and re-suspended in a solution of 5.3 g of agaricic acid dissolved in 1 liter of water containing 1.3 g of sodium hydroxide. The suspension was adjusted at a pH of 11.8 with sodium hydroxide and heated in an autoclave at 120° C. for 5 hours with stirring. The resulting precipitates were treated as in the preceding examples to obtain the desired acicular ferric oxide particles having an average particle length of 0.8 microns and an average diameter of 0.1 microns.

EXAMPLE 11

To 3 liters of an aqueous solution of ferric chloride corresponding a Fe concentration of 11.4 g/liter was added a 10% aqueous solution of sodium hydroxide to a pH of 6.5. The resulting red-brown precipitates were filtered off, washed with water and resuspended in 1 liter of water containing 1.2 g. of dl-malic acid. The suspension was adjusted at a pH of 10.4 with sodium hydroxide and heated in an autoclave at 130° C. for 3 hours with stirring. The reaction mixture was treated as in the preceding examples to obtain the desired acicular ferric oxide particles having an average length of 0.3 microns and an average diameter of 0.1 microns.

EXAMPLE 12

To 2 liters of an aqueous solution of ferric nitrate corresponding to a Fe concentration of 12.5 g/liter was added a 5% aqueous solution of sodium hydroxide to a pH of 6.5. The resulting precipitates were filtered off, washed with water and resuspended in a solution of a mixture of 0.2 g of sodium dl-tartaratedihydrate and 0.75 g of sodium citrate dihydrate dissolved in 1 liter of water. The suspension was adjusted at a pH of 11.3 with sodium hydroxide and heated in an autoclave at 170° C. for 90 minutes with stirring. The reaction mixture was treated as in preceding examples to obtain the desired acicular ferric oxide having an average length of 0.5 microns and an average diameter of 0.08 microns.

EXAMPLE 13

To 1.5 liters of an aqueous solution of ferric sulfate corresponding to a Fe concentration of 12.0 g/liter was added a 5% aqueous solution of sodium hydroxide to a pH of 7.0. The resulting precipitates were filtered off, washed with water and re-suspended in a solution of 3.3 g. of desoxalic acid dissolved in 1 liter of water. The suspension was adjusted at a pH of 10.2 and heated in an autoclave at 160° C. for 3 hours with stirring. The reaction mixture was treated as in the preceding examples to obtain the desired acicular ferric oxide particles having an average length of 0.4 microns and an average diameter of 0.08 microns.

EXAMPLE 14

The product of Example 1 was heated in a rotary electric furnace in an atmosphere of hydrogen gas at 350° C. for 3 hours and then oxidized with air at a temperature of 100° C. to 200° C. for 2 hours. The resulting $\gamma$-$Fe_2O_3$ particles retained substantially the same acicular configuration as that of the starting $\alpha$-$Fe_2O_3$ particles and the formation of pin-holes, branches or aggregates did not occur during the foregoing treatment.

The resulting $\gamma$-$Fe_2O_3$ particles showed a coersive force Hc=450 Oe and a saturation magnetization $\sigma s$=74.0 emu/g. The product showed an oil absorption of 31 ml/100 mg. when measured according to JIS K-5101 and was easily dispersed in a suitable vehicle.

EXAMPLE 15

The product of Example 8 was processed as in Example 14 to produce acicular $\gamma$-$Fe_2O_3$. The resulting $\gamma$-$Fe_2O_3$ particles retained substantially the same acicular configuration as that of the starting $\alpha$-$Fe_2O_3$ particles and showed a coersive force Hc=400 Oe, a saturation magnetization $\sigma s$=74.5 emu/g. and an oil absorption according to JIS K-5101 of 30 ml/100 mg. The average length and average diameter of the $\gamma$-$Fe_2O_3$ particles were 0.4 microns and 0.07 microns, respectively.

The above has been offered for illustrative purposes only, and is not intended to limit the scope of the invention of this application, which is as defined in the claims below.

We claim:

1. A method for producing single crystalline, acicular ferric oxide particles which comprises maintaining an aqueous suspension of amorphous ferric hydroxide at an elevated temperature from 80° C. to 300° C. at an alkaline pH in the presence of an effective amount of a growth-regulating agent dissolved in said suspension, said agent being selected from the group consisting of an organic phosphonic acid, a salt thereof, an ester thereof, a hydroxycarboxylic acid, a salt thereof, and an ester thereof, said elevated temperature being maintained for a length of time sufficient to convert said amorphous ferric hydroxide into said acicular ferric oxide particles.

2. The method of claim 1, said organic phosphonic acid has the formula:

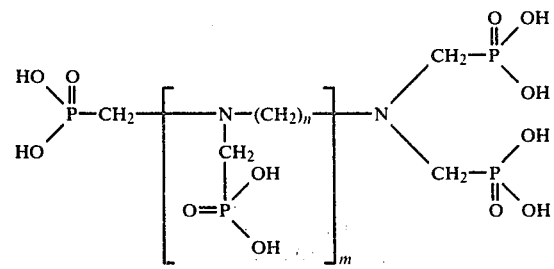

wherein n is an integer of 2 to 6 and m is 0 or an integer of 1 to 5.

3. The method of claim 1, said organic phosphonic acid has the formula:

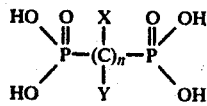

wherein X and Y are hydrogen, hydroxy, amino, or $C_1$-$C_6$ alkyl or aryl, and n is an integer of 1 to 6.

4. The method of claim 3, said organic phosphonic acid has the formula:

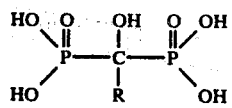

wherein R is $C_1$-$C_5$ alkyl.

5. The method of claim 1, said hydroxycarboxylic acid is α-hydroxyaliphaticcarboxylic acid.

6. The method of claim 5, said α-hydroxy aliphatic carboxylic acid is selected from the group consisting of malic acid, α-methylmalic acid, propyltartaronic acid, α-hydroxyglutaric acid, citric acid, agaricic acid, norcaperatic acid, desoxalic acid, tartaric acid and dihydroxyglutaric acid.

7. The method of claim 1, wherein said elevated temperature ranges from 100° C. to 250° C.

8. The method of claim 1, wherein said pH ranges from 8.0 to 12.5.

9. The method of claim 8, wherein said growth regulating agent is present in said suspension at a concentration from $10^{-5}$ to $10^{-1}$ moles in terms of the free acid/mole of the Fe content.

10. The method of claim 1, wherein said ferric hydroxide is present in said suspension at a concentration of 0.02 to 1.5 moles/liter in terms of the Fe content.

11. A method for producing magnetic powder for use in magnetic recording media which comprises heating the acicular ferric oxide produced by the method of claim 1 in a reducing atmosphere for a length of time sufficient to produce acicular magnetite.

12. A method for producing magnetic powder for use in magnetic recording media which comprises heating the acicular ferric oxide produced by the method of claim 1 in a reducing atmosphere for a length of time sufficient to produce acicular magnetite and oxidizing the resulting magnetite to yield acicular gamma ferric oxide.

* * * * *